(12) United States Patent
Mittal et al.

(10) Patent No.: US 9,761,004 B2
(45) Date of Patent: Sep. 12, 2017

(54) METHOD AND SYSTEM FOR AUTOMATIC DETECTION OF CORONARY STENOSIS IN CARDIAC COMPUTED TOMOGRAPHY DATA

(75) Inventors: Sushil Mittal, Piscataway, NJ (US); Yefeng Zheng, Dayton, NJ (US); Bogdan Georgescu, Plainsboro, NJ (US); Fernando Vega-Higuera, Erlangen (DE); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 2370 days.

(21) Appl. No.: 12/487,223

(22) Filed: Jun. 18, 2009

(65) Prior Publication Data

US 2010/0076296 A1 Mar. 25, 2010

Related U.S. Application Data

(60) Provisional application No. 61/098,857, filed on Sep. 22, 2008.

(51) Int. Cl.
*A61B 6/03* (2006.01)
*G06T 7/00* (2017.01)
*G06T 7/13* (2017.01)

(52) U.S. Cl.
CPC .......... *G06T 7/0085* (2013.01); *G06T 7/0012* (2013.01); *G06T 7/13* (2017.01); *G06T 2207/10081* (2013.01); *G06T 2207/20044* (2013.01); *G06T 2207/20081* (2013.01); *G06T 2207/30048* (2013.01); *G06T 2207/30101* (2013.01)

(58) Field of Classification Search
None
See application file for complete search history.

(56) References Cited

U.S. PATENT DOCUMENTS

| | | | |
|---|---|---|---|
| 4,692,864 A | 9/1987 | Shimoni et al. | |
| 5,872,861 A * | 2/1999 | Makram-Ebeid | ..... G06T 7/0012 128/922 |
| 6,377,832 B1 * | 4/2002 | Bergman | ............... A61B 5/055 128/925 |
| 6,408,201 B1 | 6/2002 | Foo et al. | |
| 6,741,880 B1 | 5/2004 | Foo et al. | |
| 7,291,111 B2 | 11/2007 | Shertukde et al. | |

(Continued)

OTHER PUBLICATIONS

Tu et al, "Automated Extraction of the Cortical Sulci Based on a Supervised Learning Approach", IEEE Transactions on Medical Imaging, vol. 26, No. 4, Apr. 2007.*

(Continued)

*Primary Examiner* — Long V Le
*Assistant Examiner* — Don N Ho

(57) ABSTRACT

A method and system for automatic coronary stenosis detection in computed tomography (CT) data is disclosed. Coronary artery centerlines are obtained in an input cardiac CT volume. A trained classifier, such as a probabilistic boosting tree (PBT) classifier, is used to detect stenosis regions along the centerlines in the input cardiac CT volume. The classifier classifies each of the control points that define the coronary artery centerlines as a stenosis point or a non-stenosis point.

20 Claims, 4 Drawing Sheets

(56) References Cited

U.S. PATENT DOCUMENTS

2006/0050941 A1  3/2006  Middleton et al.
2008/0101676 A1  5/2008  Zheng et al.

OTHER PUBLICATIONS

Igsum, et al., "Detection of Coronary Calcifications from Computed Tomography Scans for Automated Risk Assessment of Coronary Artery Disease", Medical Physics, Apr. 2007.
Stefan et al., "Automatic Detection of Calcified Coronary Plaques in Computed Tomography Data Sets", MICCAI, 2008, pp. 170-177.

* cited by examiner

400

METHOD AND SYSTEM FOR AUTOMATIC DETECTION OF CORONARY STENOSIS IN CARDIAC COMPUTED TOMOGRAPHY DATA

This application claims the benefit of U.S. Provisional Application No. 61/098,857, filed Sep. 22, 2008, the disclosure of which is herein incorporated by reference.

BACKGROUND OF THE INVENTION

The present invention relates to medical imaging of the heart, and more particularly, to automatic detection of coronary stenosis in cardiac computed tomography (CT) image data.

Coronary stenosis is the constriction or narrowing of a coronary artery, and is among the leading causes of heart attack. Coronary stenosis is typically caused by fat, cholesterol, and other substances that clog the coronary arteries over time. Traditionally coronary stenosis was detected using angiography, which is an invasive procedure. However, medical imaging of the heart, such as computed tomography (CT) imaging can be used to non-invasively detect coronary stenosis. Coronary stenosis is typically classified into two types: calcified plaque and non-calcified plaque. The calcified plaque usually appears as bright regions in contrast enhanced CT images, while the non-calcified plaque appears as darker regions in the arteries.

Manual detection and segmentation of stenosis in cardiac CT images is not only a tedious task, but is also subject to inter-observer variability. Accordingly, automatic stenosis detection in CT images is desirable. In Igsum et al., "Detection of Coronary Calcifications from Computed Tomography Scans for Automated Risk Assessment of Coronary Artery Disease", *Medical Physics*, April 2007, a heart and aorta segmentation is applied to native CT data sets and specific features are used automatically detect coronary calcifications using a two-stage calcification detection system with a k-NN (Nearest Neighbor) classifier and a feature selection scheme. This technique was able to detect 73.8% of the calcified plaques with an average of 0.1 false positives per scan. Although fully automatic, this method was specifically designed for calcium scoring, and does not detect non-calcified plaques. More recently, Stefan et al., "Automatic Detection of Calcified Coronary Plaques in Computed Tomography Data Sets", *MICCAI*, 2008, 170-177, proposed a framework for the automatic detection of calcified plaques. This framework made use of both angio (i.e., contrast weighted) and native (i.e., non-contrast weighted) CT data sets. This framework was able to achieve an 85.5% detection rate for calcified plaques with a positive prediction value (PPV) of 87.8%.

BRIEF SUMMARY OF THE INVENTION

The present invention provides a method and system for automatic detection of coronary stenosis in cardiac computed tomography (CT) data. Embodiments of the present invention utilize a fully automatic learning-based method for detecting both calcified and non-calcified plaques.

In one embodiment of the present invention, coronary artery centerlines are obtained in a cardiac CT volume. A trained classifier, such as a probabilistic boosting tree (PBT) classifier, is used to detect stenosis regions along the centerlines in the input cardiac CT volume. The coronary artery centerlines can be defined by a plurality of control points. The classifier classifies each of the control points that define the coronary artery centerlines as a stenosis point or a non-stenosis point. The classifier can be a PBT classifier trained based on training data using various local features.

These and other advantages of the invention will be apparent to those of ordinary skill in the art by reference to the following detailed description and the accompanying drawings.

DETAILED DESCRIPTION

The present invention is directed to a method and system for automatic detection of coronary stenosis in cardiac computed tomography (CT) image data. Embodiments of the present invention are described herein to give a visual understanding of the coronary stenosis detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention utilize a learning-based technique for fully automatic detection of both calcified and non-calcified stenosis. Detection of stenosis regions in a CT volume relies on estimated coronary artery centerlines in the CT volume. A learning-based classifier is trained based on training data, and used to classify points on the estimated centerlines into stenosis and non-stenosis regions.

Figure 1:
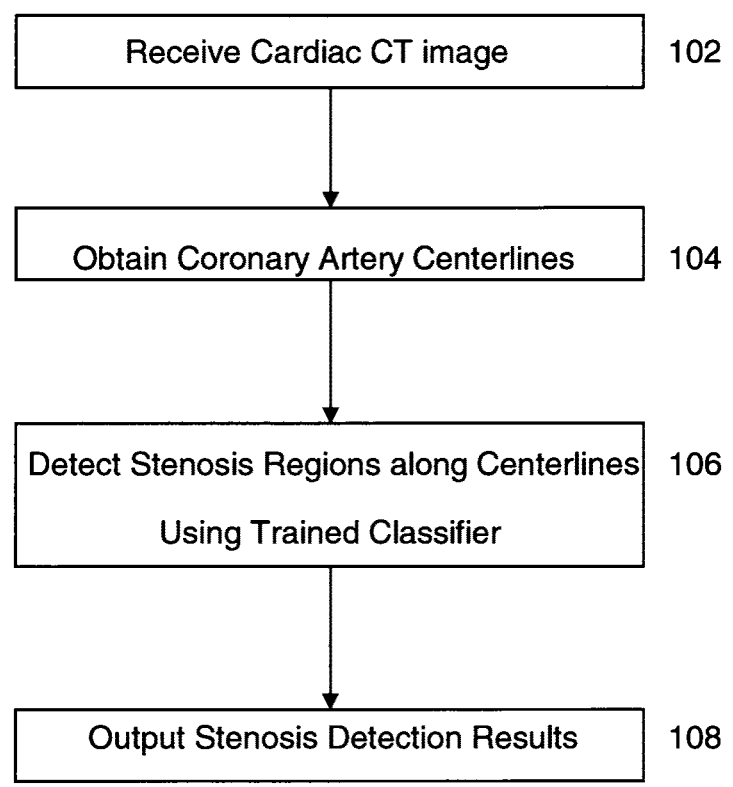
FIG. 1 illustrates a method for detecting coronary stenosis in a cardiac CT volume according to an embodiment of the present invention.

FIG. 1 illustrates a method for detecting coronary stenosis in a cardiac CT volume according to an embodiment of the present invention. The method of FIG. 1 transforms CT image data representing a patient's heart into data that indicates where stenosis regions are located in the patient's heart. At step 102, a 3D cardiac CT volume is received. The CT volume can be received from an image acquisition device, such as a CT scanning device, or can be a previously stored CT volume loaded from memory or storage of a computer system, or some other computer readable medium. The received CT volume can be a contrast enhanced CT volume.

At step 104, coronary artery centerlines are obtained in the CT volume. According to an advantageous embodiment of the present invention, centerlines are estimated for the four main coronary artery trunks: Left Main (LM), Left Anterior Descending (LAD), Left Circumflex (LCX), and Right Coronary Artery (RCA). Each of these coronary artery centerlines are represented by control points that define the centerlines in the CT volume. The LM can be represented with eight uniformly distributed control points, and each of the LAD, LCX, and RCA can be represented with 64 uniformly distributed control points. According to a possible implementation, the coronary artery centerlines can be automatically estimated in the CT volume. For example, the coronary artery centerlines can be estimated using machine learning based coronary artery detection, such as the technique disclosed in U.S. patent application Ser. No. 12/487,121, filed on Jun. 18, 2009, which is incorporate herein by reference. According to another possible implementation, coronary artery centerlines can be manually annotated. In this case, the centerlines can be obtained as user input received via an input device, such as a mouse, connected to a computer system performing the stenosis detection method.

At step 106, stenosis regions are detected along the coronary artery centerlines in the CT volume using a trained classifier. In particular, each control point of the coronary artery is classified into a stenosis region or non-stenosis region by the trained classifier. The classifier can determine, for each control point, a probability that the control point is in a stenosis region. A threshold is then used to classify each control point as a stenosis region or non-stenosis region based on the determined probability.

Figure 2:
FIG. 2 illustrates an exemplary CT image showing annotated stenosis regions.

According to an advantageous embodiment, the trained classifier is trained based on training data using a probabilistic boosting tree (PBT). The training data can include multiple contrast-enhanced cardiac CT volumes. In each of these training volumes, the centerlines of the LM, LAD, LCX, and RCA are annotated. The LM in each training volume can be represented with eight uniformly distributed control points, and the LAD, LCX, and RCA each can be represented with 64 uniformly distributed control points. Coronary stenosis regions are annotated in each training volume. In order to annotate coronary stenosis regions, a cuboid shape can be defined around each stenosis region. FIG. 2 illustrates an exemplary CT image showing annotated stenosis regions. As illustrated in FIG. 2, image 200 is a cardiac CT image showing annotated coronary artery centerlines 202 and annotated stenosis regions 204, 206, 208, 210, 212, 214, and 216. As shown in FIG. 2, the width and height of each cuboid used to define the stenosis regions 204, 206, 208, 210, 212, 214, and 216 is fixed while the length of each cuboid varies depending on the length of the corresponding stenosis region 204, 206, 208, 210, 212, 214, and 216 along the coronary artery. According to a possible implementation, in order to enhance the training of the PBT classifier, each control point on the annotated coronary artery centerlines of the training volumes can be linearly interpolated one or more times in order to add additional control points to the training dataset. For example, according to an advantageous implementation, each control point can be linearly interpolated 5 times, and the resulting additional points are used along with the original control points for training of the PBT classifier.

The PBT learns from a set of local features taken from sample points in the training volumes around each control point. These local features can be scale and shift invariant features. The PBT uses the features to train simple weak classifiers, and combines the weak classifiers into a strong classifier. Various sets and numbers of features can be utilized along with various numbers and arrangements of sample points for each control point. According to an advantageous implementation, it is possible to use 24 features with sample points obtained from a region of 5×5×9 voxels around each control point. These features can be extracted based on the intensity and gradient of the original training volume. For example, suppose a sampling point (x, y, z) has an intensity I and a gradient $g=(g_x, g_y, g_z)$. The three axes of an object oriented local coordinate system are $n_x$, $n_y$, $n_z$. The angle between the gradient g and the z axis is $\alpha = \arccos(n_z \cdot g)$, where $n_z \cdot g$ means the inner product between two vectors $n_z$ and g. In this case the following 24 local features can be extracted for each sampling point: I, $\sqrt{I}$, $\sqrt[3]{I}$, $I^2$, $I^3$, log I, $\|g\|$, $\sqrt{\|g\|}$, $\sqrt[3]{\|g\|}$, $\|g\|^2$, $\|g\|^3$, log $\|g\|$, $\alpha$, $\sqrt{\alpha}$, $\sqrt[3]{\alpha}$, $\alpha^2$, $\alpha^3$, log $\alpha$, $g_x$, $g_y$, $g_z$, $n_x \cdot g$, $n_y \cdot g$, and $n_z \cdot g$. The first six of these features are based on intensity, and the remaining 18 are transformations of gradients.

Once trained based on the training data, the PBT-based classifier determines, for each control point along the coronary artery centerlines of an input CT volume, a probability of that control point being in a stenosis region. A threshold is used to classify each control point as a stenosis region or non-stenosis region based on the probability determined by the classifier. The threshold can be determined based on rates of correct detection and false positives in the training dataset. The threshold may be determined automatically or set by a user. According to a possible implementation, the control points of the coronary artery centerlines of an input CT volume may be interpolated, as described above in connection with the training volumes, and the resulting additional control points can also be classified by the PBT-based classifier in order to increase accuracy of the stenosis detection in the input CT volume.

Returning to FIG. 1, at step 108, the stenosis detection results are output. The stenosis detection results can be output by displaying the CT volume or 2D images or "slices" of the CT volume on a display device, such as a display device of a computer system. The CT images can be displayed with a visual indication of which control points are classified as stenosis regions. For example, control points classified as stenosis may be displayed using a different color from control points classified as non-stenosis. The stenosis detection results can also be output by storing the stenosis detection results to a memory or storage of a computer system or to a computer readable medium.

Figure 3:
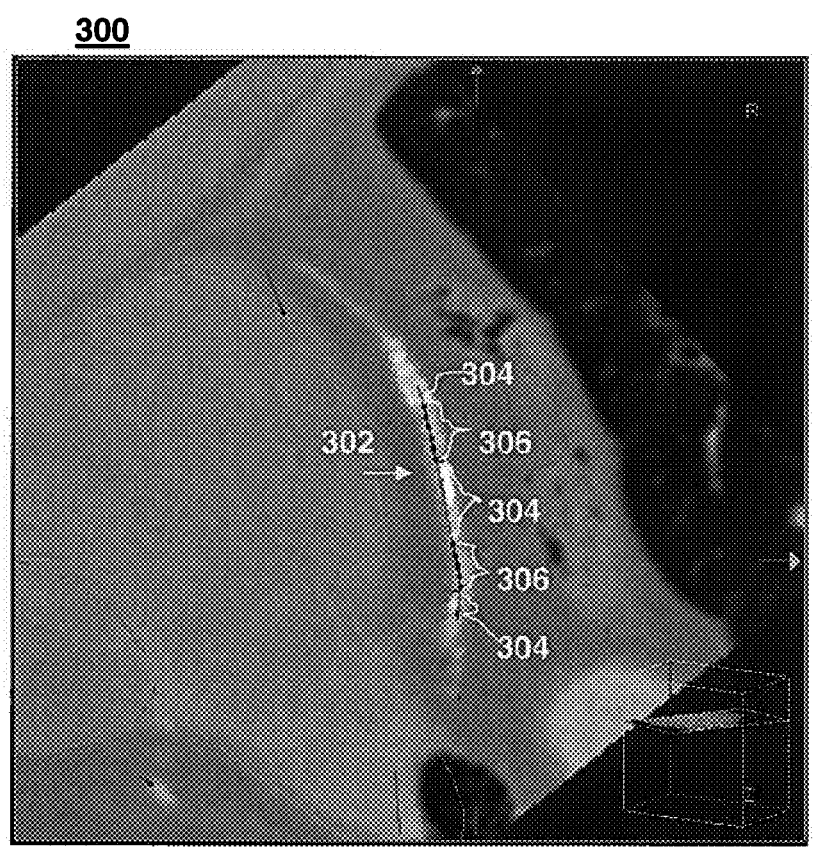
FIG. 3 illustrates exemplary stenosis detection results using the stenosis detection method of FIG. 1.

FIG. 3 illustrates exemplary stenosis detection results using the stenosis detection method of FIG. 1. Image 300 shows a multiple plane reformatting (MPR) plane of an exemplary CT volume. As illustrated in FIG. 3, image 300 shows a coronary artery centerline 302. Control points 304 along centerline 302 are classified as stenosis by the PBT classifier, thus defining stenosis regions, and control points 306 along centerline 302 are classified as non-stenosis, thus defining normal regions.

Figure 4:
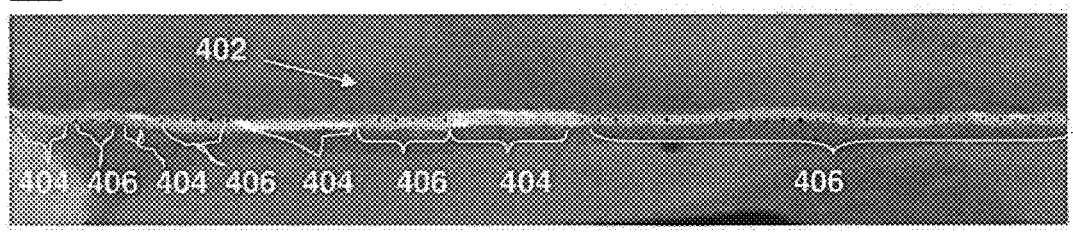
FIG. 4 illustrates exemplary stenosis detection results using the stenosis detection method of FIG. 1.

FIG. 4 illustrates exemplary stenosis detection results using the stenosis detection method of FIG. 1. Image 400 shows a curved multiple plane reformatting (MPR) view of an exemplary CT volume after stretching the coronary centerline 402. As illustrated in FIG. 4, control points 404 along centerline 402 are classified as stenosis by the PBT classifier, thus defining stenosis regions, and control points 406 along centerline 402 are classified as non-stenosis, thus defining normal regions.

Figure 5:
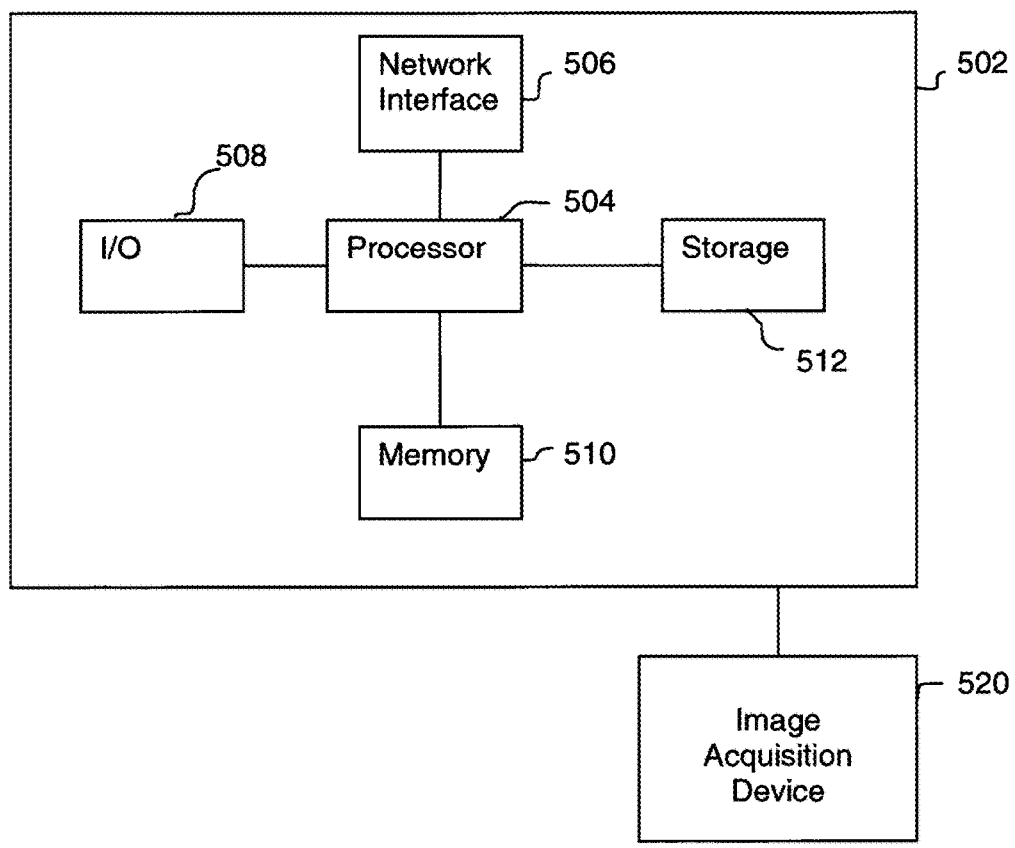
FIG. 5 is a high level block diagram of a computer capable of implementing the present invention.

The above-described methods for automatic stenosis detection in CT image data may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.) and loaded into memory 510 when execution of the computer program instructions is desired. Thus, the steps of the method of FIG. 1 may be defined by the computer program instructions stored in the memory 510 and/or storage 512 and controlled by the processor 504 executing the computer program instructions. An image acquisition device 520, such as a CT scanning device, can be connected to the computer 502 to input the 3D volumes to the computer 502. It is possible to implement the image acquisition device 520 and the computer 502 as one device. It is also possible that the image acquisition device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). Such input/output devices 508 may be used in conjunction with a set of computer programs as an annotation tool to annotate volumes received from the image acquisition device 520. One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting coronary stenosis in a cardiac computed tomography (CT) volume, comprising:
obtaining at least one coronary artery centerline in said CT volume, said at least one coronary artery centerline comprising a plurality of control points;
detecting stenosis regions along said at least one coronary artery centerline in said CT volume by classifying each of said plurality of control points as a stenosis point or a non-stenosis point using a trained machine learning based classifier; and
displaying CT images with a visual indication of the control points classified as stenosis points.

2. The method of claim 1, wherein said machine learning based trained classifier is a probabilistic boosting tree (PBT) classifier trained based on training data.

3. The method of claim 2, wherein said training data comprises a plurality of training cardiac CT volumes having annotated stenosis regions and annotated coronary artery centerlines comprising a plurality of control points, and said PBT classifier is trained by sampling a plurality of sampling points surrounding each control point of the coronary artery centerlines of the training CT volumes and extracting plurality of local features at each sampling point.

4. The method of claim 1, wherein said step of classifying each of said plurality of control points as a stenosis point or a non-stenosis point using said trained machine learning based classifier comprises:
determining, for each of said plurality of control points, a probability of being in a stenosis region, using said trained machine learning based classifier; and
classifying each of said plurality of control points as a stenosis point or a non-stenosis point based on the determined probability and a threshold.

5. The method of claim 1, wherein said at least one coronary artery centerline comprises Left Main (LM), Left Anterior Descending (LAD), Left Circumflex (LCX), and Right Coronary Artery (RCA) coronary artery trunk centerlines.

6. The method of claim 5, wherein each of said LM, LAD, LCX, and RCA coronary artery trunk centerlines comprises a plurality of control points, and said step of detecting stenosis regions along said at least one coronary artery centerline comprises:
classifying each of said plurality of control points of each of said LM, LAD, LCX, and RCA coronary artery trunk centerlines as a stenosis point or a non-stenosis point using said trained machine learning based classifier.

7. The method of claim 6, wherein said LM coronary artery trunk centerline comprises eight uniformly distributed control points, and said LAD, LCX, and RCA coronary artery centerlines each comprise 64 uniformly distributed control points.

8. The method of claim 1, wherein said step of obtaining at least one coronary artery centerline in said CT volume comprises:
automatically obtaining said at least one coronary artery centerline in said CT volume using machine learning based coronary artery detection.

9. The method of claim 1, further comprising:
displaying said CT volume with the detected stenosis regions.

10. An apparatus for detecting coronary stenosis in a cardiac computed tomography (CT) volume, comprising:
a processor; and
a memory storing computer program instruction, which when executed by the processor cause the processor to perform operations comprising:
obtaining at least one coronary artery centerline in said CT volume, said at least one coronary artery centerline comprising a plurality of control points;
detecting stenosis regions along said at least one coronary artery centerline in said CT volume by classifying each of said plurality of control points as a stenosis point or a non-stenosis point using a trained machine learning based classifier; and
displaying CT images with a visual indication of the control points classified as stenosis points.

11. The apparatus of claim 10, wherein said classifying each of said plurality of control points as a stenosis point or a non-stenosis point using said trained machine learning based classifier comprises:
determining, for each of said plurality of control points, a probability of being in a stenosis region using said trained machine learning based classifier; and
classifying each of said plurality of control points as a stenosis point or a non-stenosis point based on the determined probability and a threshold.

12. The apparatus of claim 10, wherein said at least one coronary artery centerline comprises Left Main (LM), Left Anterior Descending (LAD), Left Circumflex (LCX), and Right Coronary Artery (RCA) coronary artery trunk centerlines.

13. The apparatus of claim 10, wherein said obtaining at least one coronary artery centerline in said CT volume comprises:

automatically obtaining said at least one coronary artery centerline in said CT volume using machine learning based coronary artery detection.

14. The apparatus of claim 10, wherein said operations further comprise:
displaying said CT volume with the detected stenosis regions.

15. A non-transitory computer readable medium encoded with computer executable instructions for detecting coronary stenosis in a cardiac computed tomography (CT) volume, the computer executable instructions defining steps comprising:
obtaining at least one coronary artery centerline in said CT volume, said at least one coronary artery centerline comprising a plurality of control points;
detecting stenosis regions along said at least one coronary artery centerline in said CT volume by classifying each of said plurality of control points as a stenosis point or a non-stenosis point using a trained machine learning based classifier; and
displaying CT images with a visual indication of the control points classified as stenosis points.

16. The non-transitory computer readable medium of claim 15, wherein said trained machine learning based classifier is a probabilistic boosting tree (PBT) classifier trained based on training data.

17. The non-transitory computer readable medium of claim 15, wherein the computer executable instructions defining the step of classifying each of said plurality of control points as a stenosis point or a non-stenosis point using said trained classifier comprise computer executable instructions defining the steps of:

determining, for each of said plurality of control points, a probability of being in a stenosis region, using said trained machine learning based classifier; and
classifying each of said plurality of control points as a stenosis point or a non-stenosis point based on the determined probability and a threshold.

18. The non-transitory computer readable medium of claim 15, wherein said at least one coronary artery centerline comprises Left Main (LM), Left Anterior Descending (LAD), Left Circumflex (LCX), and Right Coronary Artery (RCA) coronary artery trunk centerlines.

19. The non-transitory computer readable medium of claim 18, wherein each of said LM, LAD, LCX, and RCA coronary artery trunk centerlines comprises a plurality of control points, and the computer executable instructions defining the step of detecting stenosis regions along said at least one coronary artery centerline comprise computer executable instructions defining the step of:
classifying each of said plurality of control points of each of said LM, LAD, LCX, and RCA coronary artery trunk centerlines as a stenosis point or a non-stenosis point using said trained machine learning based classifier.

20. The non-transitory computer readable medium of claim 15, wherein the computer executable instructions defining the step of obtaining at least one coronary artery centerline in said CT volume comprise computer executable instructions defining the step of:
automatically obtaining said at least one coronary artery centerline in said CT volume using machine learning based coronary artery detection.

* * * * *